United States Patent [19]

Kaplan

[11] Patent Number: 4,861,511

[45] Date of Patent: Aug. 29, 1989

[54] TOILET BOWL CLEANER AND STAIN-INHIBITING COMPOSITION

[75] Inventor: Roy I. Kaplan, Naperville, Ill.

[73] Assignee: Nalco Chemical Company, Naperville, Ill.

[21] Appl. No.: 77,106

[22] Filed: Jun. 26, 1987

[51] Int. Cl.⁴ ........................ C11D 17/00; C02F 5/10; E03D 9/02

[52] U.S. Cl. ................................ 252/174.23; 252/174; 252/180; 252/90; 252/DIG. 16; 4/227; 4/228

[58] Field of Search ............... 252/DIG. 16, 180, 174, 252/90, 174.23; 4/227, 228

[56] References Cited

U.S. PATENT DOCUMENTS 4,269,723 5/1981 Barford et al. ...................... 252/174

*Primary Examiner*—Paul Lieberman

*Assistant Examiner*—Helene Kirschner

*Attorney, Agent, or Firm*—Wenderoth, Lind & Ponack

[57] ABSTRACT

A composition suitable for cleaning and preventing the staining of toilet bowls is provided herein. This composition is made of low molecular weight water-soluble polyacrylate, a low molecular weight copolymer preferably a copolymer of an acrylamide and acrylic acid, and a binder. The composition may also optionally contain an inorganic salt, a surfactant, a dye and perfume. The composition is preferably in the form of a cake or pellet and added to the tank of a toilet so that the cleaning and stain-inhibiting ingredients are released into the toilet bowl upon each flush of the toilet. The invention also includes a method of cleaning and preventing the staining of a toilet bowl by the use of such composition.

25 Claims, No Drawings

TOILET BOWL CLEANER AND STAIN-INHIBITING COMPOSITION

FIELD OF THE INVENTION

The invention relates to a toilet bowl cleaner composition capable of preventing staining in toilet bowls due primarily to the deposition of iron, magnesium, manganese and calcium compounds on the toilet bowl surfaces. This composition is preferably added to the toilet tank in the form of slowly dissolving cakes or pellets so that the active ingredients which clean the toilet bowl and prevent staining, are slowly dispersed into the toilet bowl upon flushing of the toilet to both clean the toilet and prevent staining of the toilet, particularly staining due to the deposition of iron, magnesium, manganese and calcium compounds on the surface of the toilet bowl.

BACKGROUND OF THE INVENTION

Many attempts have been made to produce compositions to simultaneously clean and prevent staining of toilet bowls due to the deposition of minerals on the surface thereof. Many such attempts have concentrated upon the prevention of the mineral staining of toilet bowls, as described in such patents as U.S. Pat. Nos. 4,302,350; 4,129,423 and 3,303,104. These patents, however, have focused upon staining due to manganese because manganese stains are particularly tenacious and difficult to remove.

None of these compositions, however, appear effective in simultaneously preventing the staining of toilets due to the deposition of calcium compounds such as $CaCO_3$, magnesium compounds such as $MgCO_3$, iron compounds such as $Fe_2O_3$ and manganese compounds such as $MnO_2$, which compounds all significantly contribute to the staining of the toilet bowl and/or encrustation at the water line of the toilet bowl. To overcome such problems, it has been discovered by the present inventor that the combination of two polymers, particularly a low molecular weight, water-soluble alkali metal salt of a polyacrylate and a low molecular weight water-soluble copolymer of acrylamide and acrylic acid or a copolymer of acrylic acid with certain acrylic acid esters is capable of inhibiting all of the aforementioned major types of mineral staining in a toilet bowl.

Another problem in formulating such toilet bowl cleaning and/or stain-inhibiting compositions resides in the difficulty of preparing slowly dissolving cakes or pellets which are ordinarily added to the tanks of toilets, so that upon flushing of the toilet, the active ingredients which clean and prevent staining are properly released into the toilet bowl. Such cakes or pellets must be capable of dispensing the active ingredients for preventing sedimentation of the various minerals in the toilet bowl in an even and continuous release over an extended period of time. The formulation of a cake to achieve these results is delicate because one must choose a matrix which is capable of slowly eroding and dispensing the ingredients and yet be capable of lasting for a extended period of time in the toilet tank.

According to the present invention, a slow-dissolving cake has been formulated, which is capable of metering out or dispensing the aforementioned, low molecular weight, water soluble polymers from the toilet tank into the toilet bowl during the flushing operation by formulating such polymers with binders and optionally inorganic salts or weighting agents and surfactants to produce a cake which is slowly eroded so as to dispense the active ingredients into the toilet bowl during each flushing, while at the same time lasting over an extended period of time, i.e., for at least one month or so.

SUMMARY OF THE INVENTION

It is an object of the present invention to provide a composition which is capable of preventing the mineral staining of toilet bowls.

It is another object to provide a composition which is capable of preventing the mineral staining of toilet bowls, while simultaneously cleaning the toilet bowl so that it remains clean and stain-free over an extended period of time.

It is another object of the present invention to formulate a cake or pellet for insertion into the toilet tank of toilet, which cake or pellet is capable of dispensing cleaners and stain inhibitors into the toilet bowl during the flushing of the toilet, and a method of achieving such objective.

These objects are achieved by the formulation of such polymer combination as described above in combination with binders, such as carboxymethylcellulose and guar gum to form a slowly dissolving cake or pellet capable of dispensing the active ingredients into the toilet bowl at each flushing of the toilet. To produce optimum results, there may be also added to the compositions an inorganic salt such as sodium sulfate, a surfactant component, such as an anionic surface active agent, a dye and a fragrance.

DESCRIPTION OF THE PREFERRED EMBODIMENTS

The composition to be formulated into a slow-dissolving cake or pellet according to the present invention is comprised of two low molecular weight polymers which are the principal ingredients responsible for inhibiting the mineral staining of the toilet bowl.

The first polymer, polymer A, is composed of a low molecular weight water-soluble polyacrylate or an alkali metal salt of said polyacrylate, which serves to prevent deposition of $MnO_2$ that causes red/black staining of the toilet and also serves to prevent $CaCO_3$ and/or $MgCO_3$ encrustation at the waterline of the toilet. This is used in combination with polymer B, which is essentially a low molecular weight water-soluble copolymer of acrylic acid and acrylamide or a water-soluble copolymer of acrylic acid and certain acrylic acid esters, which copolymer primarily prevents deposition of $Fe_2O_3$ that causes red/brown staining of the toilet bowl. Polymer A is employed in an amount of about 2% to about 15% by weight and polymer B is used in the amount of about 5 to about 60 percent, both percentages being based upon the total weight of the composition.

Also employed as a necessary ingredient in conjunction with the polymers are binders such as polyvinyl alcohol, guar gum and carboxymethylcellulose, which help meter out the active ingredients on a controlled basis to prevent mineral staining and also serve to improve the useful life of the product. The binders are used in an amount of about 8–60 percent, preferably 8–40 percent based upon the total weight of the composition.

In addition to the polymers and binder, which constitute the essential components in the toilet bowl cleaning and anti-stain compositions of the present invention, there is also preferably employed inorganic salts, such as sodium sulfate, which function primarily as weighting agents by causing the cake product to settle to the tank bottom upon insertion of the cake in the toilet tank, whereupon the cake adheres to the bottom of the tank. The inorganic salts are also known as builders in the detergent art and have the added function of cleaning the toilet bowl upon being metered into the toilet bowl after each flushing of the toilet. These inorganic salts are used in an amount of about 10–40 percent, based upon the total weight of the composition.

To form the water soluble matrix of the cake or pellet there may be also used surface active agents, such as sodium dodecyl benzene sulfonate in an amount of about 10-40 percent by weight, based upon the total weight of the composition. This component serves to make the toilet bowl surface slippery to help prevent adherence of the stains, helps reduce the water surface tension, acts as a cleaning agent and serves as a binder in the composition.

As further ingredients, there are also optionally employed in the composition of the present invention dyes and fragrance materials primarily to enhance the aesthetic properties of the composition. It is desirable to incorporate a dye in the cake composition in order to color the water of the toilet to indicate the presence of cleaning ingredients and to improve the toilet aesthetically. The absence of color signals the need for a new cake or pellet. The fragrance components, when used, are used in an amount up to about 5.0 percent and preferably in a range of about 0.5–5.0 percent and the dyes or colorants, when used, are used in an amount up to about 10 percent and preferably in a range of about 1–10 percent.

One of the key aspects of the present invention is the use of polymers A and B, above. These polymers were selected because they show unusual activity toward preventing $CaCO_3$ scale formation by disrupting the normal crystal growth mechanisms. These polymers also prevent staining due to $F_2O_3$ and $MnO_2$ deposition on the toilet bowl surfaces. Based upon the Applicant's experiments, it is assumed that the polymer do not prevent the formation of insoluble iron and manganese oxides from soluble $Fe^{++}$and $Mn^{++}$, but rather aid in the formation of dispersible colloids of $Fe_2O_3$ and $MnO_2$ that will not settle. Notwithstanding the fundamental mechanism involved, the polymer combination prevents mineral and/or hard water staining of toilet bowls due to all of the aforementioned minerals, while at the same time forming a slowly dissolving organic matrix in conjunction with the other materials discussed above.

The above ingredients may be formulated and manufactured into solid cakes by well-known techniques well within the capability of persons of ordinary skill in the art of forming bars of toilet soap. Thus, the cakes or pellets of the present invention may be manufactured by mixing the raw materials of the polymers, binders, inorganic salts, etc., into a homogenous mass and noodling, plodding, extruding and cutting and stamping the mass to form uniform bars, cakes or pellets by these known techniques.

The specific ingredients which can be used in the composition will be set forth below although it is to be understood that the invention is not limited to such specific ingredients, these ingredients being described simply to illustrate how to practice the invention.

THE POLYMER COMPONENTS 7 Polymer A is a low molecular weight, water-soluble polyacrylate, particularly an alkali metal salt thereof, such as a sodium or potassium polyacrylate. The weight average molecular weight of this component ranges from about 1,000 to about 50,000. Examples of such polyacrylates are disclosed in USP 4,361,492, for example. This polymer is especially efficacious for preventing $CaCO_3$ and $MgCO_3$ encrustation at the water line of the toilet bowl and also to prevent deposition of $MnO_2$, which component causes red/black staining on the toilet bowl. The polyacrylate is preferably used in amounts of about 2 percent to 15 percent based on the total weight of the composition, the upper limit being primarily dictated by expense considerations.

Polymer B is a low molecular weight water-soluble copolymer of acrylic acid and acrylamide, preferably a water-soluble copolymer consisting of 20–30 percent of acrylic acid and 70–80 percent by weight of acrylamide and alkali metal salts of such polymers. The alkali metal salts conventionally used are the sodium and potassium salts of this polymer. These polymers are described in U.S. Pat. Nos. 4,361,492, 4,431,547 and 4, 502,978. Such polymers have a weight average molecular weight varying between 1,000-25,000 and preferably between 8,000 and 14,000. The water-soluble copolymer may preferably have an acrylic acid to acrylamide monomer weight ratio of between 1:4 and 1:2. This copolymer serves primarily to prevent $Fe_2O_3$ deposition which causes red/brown staining in the toilet bowl. It is present in an amount of about 5 percent to about 60 percent, preferably about 5 to about 20 percent, based on the total weight of the composition. The upper limit for polymer B is also primarily dictated by expense considerations.

Both polymers are water soluble and the combination of these polymers represent one of the prime features of the present invention. In addition to being released into the toilet bowl as active ingredients, these polymers also serve to form part of the water-soluble organic matrix which dissolves in water, thus releasing the active cleaning and mineral stain-inhibiting ingredients into the toilet bowl. The weight ratio of the polymer A to polymer B is preferably from 1:1–4 in the composition.

In place of the copolymers of acrylic acid and acrylamide, there may be used as copolymer B a copolymer of acrylic acid and methylacrylate, a copolymer of acrylic acid and ethylacrylate or a copolymer of acrylic acid and hydroxypropylacrylate. When such copolymers are used, the acrylic acid to acrylate ratio may be in the same range as that of the acrylic acid and acrylamide.

THE INORGANIC SALTS

The inorganic salts or weighting agents are formulated in the composition to cause the product to settle to the tank bottom and adhere to said tank bottom when cake formulations made of the compositions of the present invention are added to a toilet tank. These inorganic salts are typified by such components as alkali metal sulfates such as sodium sulfate, alkali metal carbonates such as sodium carbonate, alkali metal silicates such as sodium silicate and sodium metasilicate, and borates such as borax. The inorganic salts serve as cleaning agents (they are well known as builders in detergent compositions) as well as weighting agents and are used in an amount of about 10 percent to about 40 percent by weight based upon the total weight of the composition. Of course, mixtures of such inorganic salts or weighting agents may be used in the composition.

THE BINDERS

The binders help bind the ingredients together and serve to meter out the active ingredients and improve the useful life of the product. These binders are present in an amount of about 8 percent to 60 percent, preferably about 8 to about 40 percent, based upon the total weight of the composition. These binders are solid binders represented by metal alginates, e.g., alkali metal alginates, guar gum, carboxymethylcellulose, locust bean gum, gum agar, polyvinyl alcohols, polyethylene glycols, and mixtures thereof. Some of these binders, such as guar gum, locust bean gum, and gum agar, also function as gelling agents in the formulation.

An especially preferred binder combination is a combination of an carboxymethylcellulose and guar gum, which components are present so that the weight ratio of the carboxymethylcellulose to the guar gum is 1 to 2–4. This combination is especially efficacious in metering out the active ingredients such that the active components are released into the toilet bowl in optimum proportions to prevent staining over a long period of time.

Any of the aforementioned resins or gums or any resin or natural or synthetic gum capable of releasing the polymer combination in the toilet bowl in concentrations sufficient to prevent staining due to the mineral components, particularly the iron containing mineral components, may be used. It has been found that when the polymer combination is released in amounts of about 1 ppm, based upon the weight of the water in the toilet bowl, this is sufficient, although the amount may vary depending upon the mineral content of the water, etc. All of the aforementioned binders or gels have been found to satisfactorily achieve the aforementioned desirable polymer release characteristics.

Many of the gels or binders discussed above are described in the Kirk-Othmer Encyclopedia 12 (1980), the teachings of which are incorporated by reference herein.

THE SURFACTANTS

The surfactants are added for their cleaning power, to make the bowl surface slippery to help prevent adherence of the stains, to reduce the water-surface tension and to serve as a binder in the composition. Any anionic, nonionic, ampholytic or zwitterionic surfactant may be employed or mixtures of two or more surfactants. Especially preferred are anionics such as sodium dodecylbenzene sulfonate, sodium lauryl sulfate or N-acyl sarcosinates. Also preferred are nonionics such as ethoxylated nonylphenols, ethyleneoxidepropyleneoxide block polymers or ethoxylated alcohols. In addition to these broad classes, any surfactant of the type described below can be used.

As anionic surfactants suitable for use in the present invention, there can be broadly described the water-soluble salts, particularly the alkali metal salts, of organic sulfuric acid reaction products having in their molecular structure an alkyl or alkaryl radical containing from about 8 to about 22 carbon atoms and a radical selected from the group consisting of sulfonic acid and sulfuric acid ester radicals. (Included in the term alkyl is the alkyl portion of higher acyl radicals.) Important examples of the anionic surfactants which can be employed in the practicing of the present invention are the sodium or potassium alkyl sulfates, especially those obtained by sulfating the higher alcohols ($C_{8}$-$C_{18}$ carbon atoms) produced by reducing the glycerides of tallow or coconut oil; sodium or potassium alkyl benzene sulfonates, in which the alkyl group contains from about 9 to about 15 carbon atoms, (the alkyl radical can be a straight or branched aliphatic chain); paraffin sulfonate surfactants having the general formula $RSO_2M$, wherein R is a primary or secondary alkyl group containing from about 8 to about 22 carbon atoms (preferably 10 to 18 carbon atoms) and M is an alkali metal, e.g., sodium or potassium; sodium alkyl glyceryl ether sulfonates, especially those ethers of the higher alcohols derived from tallow and coconut oil; sodium coconut oil fatty acid monoglyceride sulfates and sulfonates; sodium or potassium salts of sulfuric acid esters of the reaction product of one mole of a higher fatty alcohol (e.g., tallow or coconut oil alcohols) and about 1 to 10 moles of ethylene oxide; sodium or potassium salts of alkyl phenol ethylene oxide ether sulfates with about 1 to about 10 units of ethylene oxide per molecule and in which the alkyl radicals contain from about 8 to about 12 carbon atoms; the reaction products of fatty acids esterified with isethionic acid and neutralized with sodium hydroxide where, for example, the fatty acids are derived from coconut oil; sodium or potassium salts of fatty acid amides of a methyl tauride in which the fatty acids, for example, are derived from coconut oil and sodium or potassium $\beta$-acetoxy- or $\beta$-acetamido-alkanesulfonates where the alkane has from 8 to 22 carbon atoms.

As nonionic surfactants, there can be generally used the class of nonionics known as alkylene oxide condensates and the class of nonionics classified as amides, which classes of nonionics are described below.

The alkylene oxide condensates are broadly defined as compounds produced by the condensation of alkylene oxide groups (hydrophilic in nature) with an organic hydrophobic compound, which can be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

Specific examples of such alkylene oxide condensates include:

1. The condensation products of aliphatic alcohols with ethylen oxide. The alkyl chain of the aliphatic alcohol can either be straight or branched and generally contains from about 8 to about 22 carbon atoms. Examples of such ethoxylated alcohols include the condensation product of about 6 moles of ethylene oxide with 1 mole of tridecanol, myristyl alcohol condensed with about 10 moles of ethylene oxide per mole of myristyl alcohol, the condensation product of ethylene oxide with coconut fatty alcohol wherein the coconut alcohol is a mixture of fatty alcohols with alkyl chains varying from about 10 to 14 carbon atoms and wherein the condensate contains about 6 moles of ethylene oxide per mole of alcohol, and the condensation product of about 9 moles of ethylene oxide with one mole of the above-described coconut alcohol. Examples of commercially available nonionic surfactants of this type include Tergitol 15-S-9 marketed by Union Carbide Corporation, Neodol 23-6.5 marketed by Shell Chemical Company and Kyro EOB marketed by the Procter and Gamble Company.

2. The polyethylene oxide condensates of alkyl phenols. These compounds include the condensation products of alkyl phenols having an alkyl group containing from about 6 to about 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds can be derived, for example, from polymerized propylene, diisobutylene, octene, or nonene. Examples of compounds of this type include nonyl phenol condensed with about 9.5 moles of ethylene oxide per mole of nonyl phenol, dodecyl phenol condensed with about 12 moles of ethylene oxide per mole of phenol, dinonyl phenol condensed with about 15 moles of ethylene oxide per mole of phenol, di-isooctylphenol condensed with about 15 moles of ethylene oxide per mole of phenol. Commercially available nonionic surfactants of this type include Igepal CO-610 marketed by the GAF Corporation; and Triton X-45, X-114, X-100 and X-102, all marketed by the Rohm and Haas Company.

3. The condensation products of ethylene oxide with a hydrophobic base formed by the condensation of propylene glycol. The hydrophobic portion of these compounds has a molecular weight of from about 1500 to 4000 and of course exhibits water insolubility. The addition of polyoxyethylene moieties to the hydrophobic portion tends to increase the water solubility of the molecule. Examples of compounds of this type include certain of the commercially available Pluronic surfactants marketed by the BASF-Wyandotte Chemicals Corporation.

4. The condensation products of ethylene oxide with the product resulting from the reaction of propylene oxide and ethylene diamine. The hydrophobic base of these products consists of the reaction product of ethylene diamine and excess propylene oxide, said base having a molecular weight of from about 2500 to about 3000. This base is condensed with ethylene oxide to the extent that the condensation product contains from about 40 percent to about 80 percent by weight of polyoxyethylene and has a molecular weight of from about 5,000 to about 11,000. Examples of this type of nonionic surfactant include certain of the commercially available Tetronic compounds marketed by the Wyandotte Chemicals Corporation.

Examples of the amide type of nonionic surfactants include the ammonia, monoethanol and diethanol amides of fatty acids having a acyl moiety of from about 8 to about 18 carbon atoms. These acyl moieties are normally derived from naturally occurring glycerides, e.g., coconut oil, palm oil, soybean oil and tallow, but can be derived synthetically, e.g., by the oxidation of petroleum, or by hydrogenation of carbon monoxide by the Fischer-Tropsch process.

Ampholytic surfactants which can be used in practicing the present invention can be broadly described as derivatives of aliphatic amines which contain a long chain of about 8 to about 18 carbon atoms and an anionic water-solubilizing group, e.g., carboxy, sulfo and sulfato. Examples of compounds falling within this definition are sodium-3-dodecyl-amino-propionate, sodium-3-dodecylamino propane sulfonate, and dodecyl dimethylammonium hexanoate.

Zwitterionic surfactants which can be used in practicing the present invention are broadly described as internallyneutralized derivatives of aliphatic quaternary ammonium and phosphonium and tertiary sulfonium compounds, in which the aliphatic radical can be straight chain or branched, and wherein one of the aliphatic substituents contains from about 8 to about 18 carbon atoms and one contains an anionic water-solubilizing group, e.g., carboxy, sulfo, sulfato, phosphato, or phosphono.

The surfactants may be used in an amount of about 10 to about 40 percent by weight based upon the weight of the total composition.

THE FRAGRANCE COMPONENTS

As a perfume or fragrance imparting agent, any material can be used which is compatible with the other components in the composition and which imparts a pleasing, aesthetically appealing fragrance to the composition. Particularly preferred are materials which impart a citrus-pine fragrance to the composition.

The fragrance materials when used, are preferably used in an amount up to about 5.0 percent preferably 0.5–5.0 percent by weight based upon the total weight of the composition.

THE DYES

As a dye, any component may be used in the composition which is capable of coloring the water of the toilet both to indicate the presence of cleaning ingredients, and to improve the toilet aesthetically. The absence of color signals the need for a new cake or pellet. Particularly suitable are blue or green colorants that are chemically compatible with the other components in the system, particularly the anionic components. Examples of such a dye is a 65% Azure Blue dye, manufactured by Hilton Davis.

The dye components, when used, are generally used in an amount of up to about 10 percent and preferably 1 to about 10 percent, based upon the total weight of the composition.

OTHER COMPONENTS

There may be used in the composition other components, such as disinfectants or germicides, processing aids and components conventionally used in such toilet bowl cleaning compositions.

THE EXAMPLES

The following examples were carried out to illustrate the specific embodiments of the present invention.

EXAMPLE 1

The following components were homogeneously mixed together and processed into pellets by the conventional methods described above.

| Component | Weight Percent |
|---|---|
| Low molecular weight potassium polyacrylate (Polymer A) (Mw = 4,000–8,000) | 2.3% |
| Sodium salt of the low molecular weight water-soluble copolymer of acrylamide (70%) and acrylic acid (30%) (Polymer B) (Mw = 8,000–14,000) | 4.6% |
| Anhydrous sodium sulfate | 10.0% |
| Sodium metasilicate | 2.0% |
| Carboxymethylcellulose | 28.0% |
| Polyvinyl alcohol | 3.0% |
| Citrus-pine fragrance | 0.5% |
| Sodium dodecylbenzene sulfonate | 29.0% |
| Acid Blue No. 9 dye | 4.5% |

-continued

| Component | Weight Percent |
|---|---|
| Water (as a carrier for polymers A and B) | 16.1% |

Pellets produced from the above composition were inserted into a toilet tank and tested over an extended period of time by flushing the toilet and observing any staining in the toilet bowl. The above composition was found to be effective for inhibiting staining of a toilet bowl over an extended period of time of about 1 month or more.

EXAMPLE 2

The following components were also homogeneously mixed together and processed into pellets by the conventional methods described above.

| Component | Weight Percent |
|---|---|
| Low molecular weight potassium polyacrylate (Polymer A) (Mw = 4,000–8,000) | 8.0% |
| Sodium salt of the low molecular weight water-soluble copolymer of acrylamide (70%) and acrylic acid (30%) (Polymer B) (Mw = 8,000–14,000) | 12.0% |
| Carboxymethylcellulose | 6.0% |
| Guar gum | 18.0% |
| Sodium sulfate | 20.5% |
| Sodium dodecylbenzene sulfonate | 29.0% |
| Acid Blue No. 9 dye | 6.0% |
| Fragrance oil | 0.5% |

The above composition was tested as in Example 1 and found to be similarly effective for inhibiting staining of a toilet bowl over an extended period of time, about one month or so.

EXAMPLE 3

The following composition was prepared in cake form according to conventional processing techniques.

| Component | Weight Percent |
|---|---|
| 65% Azure Blue Dye (Hilton Davis) | 1.00% |
| Pluronic F-127 (BASF-Wyandotte Chemicals Corp)[1] | 1.00% |
| Carbowax 8000 (Union Carbide)[2] | 39.00% |
| Kemamide U (Witco)[3] | 26.00% |
| Low molecular weight, water-soluble potassium polyacrylate (Mw = 4,000–8,000) | 12.24% |
| Sodium salt of low molecular weight, water-soluble copolymer of acrylamide 70%) and acrylic acid (30%) (Mw = 8,000–14,000) | 18.76% |
| 45% KOH solution | 2.00% |

[1]The Pluronic F-127 is an ethylene oxide-propylene oxide block polymer of the formula $$HO(CH_2CH_2O)_x(\underset{CH_3}{\overset{|}{C}}HCH_2O)_y(CH_2CH_2O)_zH,$$

wherein the average value of x, y and z are, respectively, 98, 67 and 98.

[2]The Carbowax 8000 is a solid polyethylene glycol of a molecular weight of approximately 8,000.

[3]The Kemamide U, a surfactant, is an oleylamide, or more specifically, 9-octadecenamide.

The cake product was inserted into a toilet tank and during a thirty-day testing period, according to procedures which will be described more completely in the Comparative Example below, the toilet bowl remained stain-free.

COMPARATIVE EXAMPLES

Tests were carried out to illustrate the criticality of the polymer combination to prevent staining by comparing the cake composition of Example 3 above with a cake composition which is the same as that of Example 3, except that the polymers A and B were omitted therefrom (i.e.,the dummy control cake). These compositions appear below.

| Component | Weight Percent Dummy Control | Weight Percent Present Invention |
|---|---|---|
| 65% Azure Blue Dye (Hilton Davis) | 1.00 | 1.00 |
| Pluronic F-127 (BASF-Wyandotte Chemicals | 1.00 | 1.00 |
| Carbowax 8000 (Union Carbide) | 58.00 | 39.00 |
| Kemamide U (Witco) | 40.00 | 26.00 |
| Low molecular weight, water-soluble sodium polyacrylate (Mw = 4,000-8,000) | | 12.24 |
| Sodium salt of low molecular weight, water-soluble copolymer of acrylamide (70%) and acrylic acid (30%) (Mw = 8,000-14,000) | | 18.76 |
| 45% KOH solution | | 2.00% |

TEST PROCEDURES AND CONDITIONS

A cake was produced from both the dummy control and the composition of the present invention described above and these cakes were inserted in the tanks of two separate toilets, located in Naperville, IL. The bowls of both toilets were cleaned with an abrasive cleaner prior to test initiation. The control toilet containing the dummy control cake and the test toilet using cakes prepared from the composition of the present invention were tested over a 30-day period in which the number of toilet flushes per day averaged 10. Neither toilet was cleaned manually during the 30-day test period.

An analysis of the make-up water to these toilets is given in Table 1. Untreated Naperville tap water contains approximately 400 ppm total calcium and magnesium hardness. The location where the testing occurred was equipped with a water softener to remove the majority of the calcium and magnesium ions. Since the potential for colored mineral staining is slight in this water, supplemental $Fe^{++}$and $Mn^{++}$was supplied to each toilet tank. Table 2 gives the $FeSO_4.7H_2O$ and $MnCl_2.4H_2O$ concentrations used for these tests. A "spike" solution containing both $Fe^{++}$and $Mn^{++}$was prepared in synthetic Colorado River Water (Table 3) and placed in plastic dispenser bottles. These dispensers allow approximately 1.1 mL of the "spike" solution to enter the toilet tank as the water refills the tank after each flush. Previous laboratory tests conducted by Applicant had shown that the polymers used in these home tests were excellent at preventing $Fe_2O_3$ and $MnO_2$ deposition under controlled conditions of very high water pH (9) and excess $ClO^-$ (10 ppm).

Table 4 gives the test parameters used. The volumes of the toilet tanks and bowls were determined by removing all the water using a wet-dry vacuum cleaner and measuring each volume collected. Although the number of toilet flushes was not the same each day, each toilet averaged 10 flushes per day.

TABLE 1

| ANALYSIS OF SOFTENED NAPERVILLE, ILLINOIS, MAKE-UP WATER | | | |
|---|---|---|---|
| Component | Reported As | Soluble (ppm) | Total (ppm) |
| Calcium | $CaCO_3$ | 12.0 | 12.0 |
| Magnesium | $CaCO_3$ | 10.0 | 10.0 |
| Sodium | $CaCO_3$ | 340.0 | 340.0 |
| Potassium | K | 3.4 | 3.4 |
| Copper | Cu | 0.11 | 0.11 |
| Iron | Fe | 0.07 | 0.07 |
| Zinc | Zn | 0.01 | 0.01 |
| Bicarbonate Alk. | $CaCO_3$ | 270.0 | 270.0 |
| Phosphorus | P | 0.30 | 0.30 |
| Silica | $SiO_2$ | 8.4 | 8.4 |
| Sulfur | S | 22.0 | 22.0 |
| Fluoride | F (free) | 1.2 | 1.2 |
| Chloride | $CaCO_3$ | 25.0 | 25.0 |
| Sulfate | $CaCO_3$ | 62.0 | 62.0 |
| Free Chlorine | $Cl_2$ | <0.02 | <0.02 |
| pH | pH | 7.1 | 7.1 |
| Conductivity | $\mu$ohm/cm | 710.0 | 710.0 |
| Turbidity | NTU | 0.8 | 0.8 |

TABLE 2

ANALYSIS OF IRON AND MANGANESE "SPIKE" SOLUTION*

Fe 200.0 g $FeSO_4.7H_2O$/liter
1.1 mL of sol'n - 44.2 mg $Fe^{++}$
In a 4.0 gal. (15.1 L) tank, 1.1 mL of sol'n - 2.93 ppm Fe Mn 34.0 g $MnCl_2.4H_2O$/liter
1.1 mL of sol'n = 10.4 mg $Mn^{++}$
In a 4.0 gal. (15.1 mL) tank, 1.1 mL of sol'n = 0.69 ppm Mn

*1.0 mL concentrated $H_2SO_4$/L was added to prevent $Fe_2O_3$ precipitation in the bottle.

TABLE 3

| ANALYSIS OF WATER USED TO PREPARE "SPIKE" SOLUTION | | |
|---|---|---|
| Component | Reported As | ppm |
| Calcium | $CaCO_3$ | 180 |
| Magnesium | $CaCO_3$ | 200 |
| Bicarbonate Alk. | $CaCO_3$ | 180 |
| Chloride | $CaCO_3$ | 75 |
| Sulfate | $CaCO_3$ | 150 |

TABLE 4

| | TEST PARAMETERS | |
|---|---|---|
| Item | Control Toilet | Test Toilet |
| Water Type | Softened Naperville Tap | Softened Naperville Tap |
| Type of Toilet | Mansfield | Mansfield |
| Volume of Water in Toilet Tank | 15.1 L | 15.1 L |
| Volume of Water in Toilet Bowl | 4.3 L | 3.8 L |
| % of Water in Bowl That Originates in Tank* | 40.5% | 40.0% |
| Approx. Flushes per day | 10 | 10 |
| Test Duration | 30 days | 30 days |
| Weight of Test | 60.0 g "Dummy" | 50.0 g Present Invention |

*Determined by dissolving 1.00 g $Na_3PO_4$ in toilet tanks, sampling, flushing, and sampling toilet bowl water. The percent of water in the bowl that originated in the tank was calculated by:

$$\frac{\text{ppm o-}PO_4\text{ in bowl}}{\text{ppm o-}PO_4\text{ in tank}} \times 100$$

TEST RESULTS AND DISCUSSION

A. Appearance of Toilet Bowls

The difference between the appearance of the control toilet bowl and that of the test toilet bowl using Applicant's inventive composition, became evident on the fifth day. Slight staining appeared on the control toilet bowl beneath the water line. The water in the control toilet was always yellow, even in the presence of the dye used to mask the color. Water in the toilet using the cake product of the present invention retained its light blue color with no evidence of precipitation, deposition, or staining.

The control toilet and test toilet using the cake product of the present invention were carefully examined after 7 and 13 days. The control toilet showed severe, even staining below the water line. Red/brown stains traced the water path from the water entry holes to the water line. The staining was so severe that mere wiping of the bowl surface removed very little of the deposition. The tank walls in the control toilet also showed severe red/brown staining. Apparently, the addition of the Pluronic F-127 surfactant and Kemamide U do little to prevent staining. The appearance of the treated toilet bowl and tank did not visibly change during the 30 days of testing.

B. Composition of the Control Toilet Deposit

A sample of the deposition product formed during the test was removed from the control toilet tank. An x-ray analysis of it is given in Table 5. The deposit was predominantly $Na_2SO_4$, mixed silicates, and $Fe_2O_3$. The staining was due to the iron oxide. Trace amounts of Al, Ti, Mg, Ca, and Cu were also found. No $MnO_2$ was formed during the test. This is probably due to the relatively low water pH (6.8–7.1) and the absence of any excess oxidizing species such as $Cl_2$ or NaOCl.

Analysis of typical toilet tank water midway through testing showed that in the control toilet with the "dummy" cake 1.7 ppm of the 2.9 ppm $Fe^{++}$ present (i.e., 59%) had precipitated and could cause staining. All of the 0.7 ppm $Mn^{++}$ remained soluble.

In respect to the test toilet containing Applicant's cake, 2.7 ppm or 93 percent of the added $Fe^{++}$ was stabilized. Again, all of the 0.7 ppm of the $Mn^{++}$ remained soluble.

TABLE 5

| X-RAY ANALYSIS OF DEPOSIT FROM CONTROL TOILET | | |
|---|---|---|
| Component | Reported As | Weight % |
| Sodium | $Na_2O$ | 50 |
| Sulfur | $SO_3$ | 15 |
| Silicon | $SiO_2$ | 11 |
| Iron | $Fe_2O_3$ | 9 |
| Chlorine | Cl | 5 |
| Aluminum | $Al_2O_3$ | 3 |
| Titanium | $TiO_2$ | 2 |
| Calcium | CaO | 1 |
| Phosphorus | $P_2O_5$ | 1 |
| Potassium | $K_2O$ | 1 |
| Magnesium | MgO | 1 |
| Copper | CuO | 1 |

It will be seen by the above that the polymer system of the present invention is indeed critical in preventing the staining of the toilet in that the dummy cake which did not contain the polymers was ineffective to prevent staining of the toilet, whereas Applicant's composition was effective to prevent staining of the toilet over a 30-day period.

What is claimed is:

1. A composition suitable for cleaning toilet bowls and for preventing staining of the toilet bowls due to the deposition of minerals on the surface thereof, said composition comprising about 2% to about 15% of a low molecular weight water-soluble polyacrylate having a weight average molecular weight ranging from about 1000 to about 50,000, or an alkali metal salt thereof as polymer A, about 5% to about 60% of a low molecular weight water-soluble copolymer having a weight average molecular weight varying from about 1,000 to about 25,000 selected from the group consisting of a copolymer of an acrylamide and acrylic acid, consisting of 70% to 80% by weight of the acrylamide and 20% to 30% by weight of acrylic acid, a copolymer of acrylic acid and methyl acrylate, a copolymer of acrylic acid and ethyl acrylate, and a copolymer of acrylic acid and hydorxypropyl acrylate and alkali metal salts thereof as polymer B, and about 8% to 60% of a binder, said percentages being based on the total weight of the composition 2. A composition according to claim 1 wherein the copolymer B is a copolymer of acrylamide and acrylic acid.

3. A composition according to claim 1 wherein the copolymer B consists of about 75% by weight of acrylamide and 25% by weight of acrylic acid.

4. A composition according to claim 1, wherein the binder is selected from the group consisting of an alginate, guar gum, carboxymethylcellulose, polyethylene glycol, locust bean gum, gum agar, polyvinyl alcohol, and mixtures thereof.

5. A composition according to claim 4 wherein the binder is a mixture of carboxymethylcellulose and guar gum in a weight ratio of 1 part by weight of the carboxymethylcellulose to 2–4 parts by weight of the guar gum.

6. A composition according to claim 1 which also contains about 10% to about 40% of surfactant, based on the total weight of the composition, said surfactant selected from the group consisting of anionic, nonionic, ampholytic and zwitterionic surfactants and mixtres thereof.

7. A composition according to claim 6 wherein the surfactant is an anionic surfactant.

8. A composition according to claim 6 wherein the surfactant is sodium dodecylbenzene sulfonate.

9. A composition according to claim 1 which also contains about 10% to about 40%, based on the total weight of the composition, of an inorganic salt.

10. A composition according to claim 9 wherein the inorganic salt is an alkali metal salt of a member selected from the group consisting of a sulfate, a carbonate, a borate, a silicate and mixtures thereof.

11. A composition according to claim 1, which also contains up to about 5.0% of a perfume and up to about 10.0% by weight of a dye, said percentages being based upon the total weight of the composition.

12. A composition according to claim 1 wherein polymer A is a low molecular weight, water-soluble alkali metal polyacrylate having a weight average molecular weight ranging from about 4,000 to about 8,000, polymer B is an alkali metal salt of a water-soluble copolymer of 70% by weight of an acryamide and 30% by weight of acrylic acid having a weight average molecular weight of about 8,000 to about 14,000, and the binder is a mixture of guar gum and carboxymethylcellulose in which the weight ratio of the former to the latter is 2–4 to 1.

13. A composition according to claim 12 which also contains about 10% to about 40% of surfactant selected from the group consisting of an anionic, nonionic, ampholytic and zwitterionic surfactants, and mixtures thereof, and 10% to about 40% of an inorganic salt selected from the group consisting of an alkali metal sulfate, an alkali metal carbonate, an alkali metal borate, an alkali metal silicate and mixtures thereof, said percentages being based on the total weight of the composition.

14. A composition according to claim 13 which also contains up to 10% by weight of a dye, based on the total weight of the composition.

15. A composition according to claim 1 wherein the composition is in the form of a cake.

16. A composition according to claim 1 wherein the composition is in the form of a pellet.

17. A method of cleaning and preventing the staining of a toilet bowl which comprises inserting into the tank of a toilet a composition in the form of a slowly dissolving cake or pellet which releases into the toilet bowl, during each flushing of the toilet, ingredients which both clean and prevent mineral staining of the toilet bowl, said composition comprising about 2% to about 15% of a low molecular weight water-soluble polyacrylate having a weight average molecular weight ranging from about 1,000 to about 50,000, or an alkali metal salt thereof as polymer A, about 5% to about 60% of a low molecular weight water-soluble copolymer having a weight average molecular weight varying from about 1,000 to about 25,000, selected from the group consisting of a copolymer of an acrylamide and acrylic acid consisting of 70% to 80% by weight of acrylamide and 20% to 30% by weight of acrylic acid, a copolymer of acrylic acid and methyl acrylate, a copolymer of acrylic acid and ethyl acrylate, a copolymer of acrylic acid and hydroxpropyl acrylate and alkali metal salts thereof as polymer B and about 8% to about 60% of a binder, said percentages being based on the total weight of the composition.

18. A method according to claim 17 wherein the copolymer B is a copolymer of an acrylamide and acrylic acid.

19. A method according to claim 17 in which the binder is selected from the group consisting of an alginate, guar gum, carboxymethylcellulose, polyethylene glycol, locust bean gum, gum agar, polyvinyl alcohol, and mixtures thereof.

20. A method according to claim 17 in which the composition also contains about 10% to about 40%, based on the total weight of the composition, of an inorganic salt.

21. A method according to claim 20 wherein the inorganic salt is an alkali metal salt of a member selected from the group consisting of a sulfate, a carbonate, a borate, a silicate and mixtures thereof, said percentages being based on the total weight of the composition.

22. A method according to claim 17 in which the composition also contains about 10% to about 40% by weight, based on the total weight of the composition, of a surfactant selected from the group consisting of anionic, nonionic, ampholytic and zwitterionic surfactants and mixtures thereof.

23. A method according to claim 17 which also contains up to about 10% of a dye.

24. A composition according to claim 1 wherein polymer B is a copolymer selected from the group consisting of a copolymer of acrylic acid and methyl acrylate, a copolymer of acrylic acid and ethyl acrylate and a copolymer of acrylic acid and hydroxpropyl acrylate and alkali metal salts thereof, wherein the polymers consists of about 20% to 30% by weight of the acrylic acid and 70% to 80% by weight of the methyl acrylate, ethyl acrylate and hydroxpropyl acrylate, respectively.

25. A method according to claim 17, wherein polymer B is a copolymer selected from the group consisting of a copolymer of acrylic acid and methyl acrylate, a copolymer of acrylic acid and ethyl acrylate and a copolymer of acrylic acid and hydroxypropyl acrylate and alkali metal salts thereof, wherein the polymers consists of about 20% to 30% by weight of the acrylic acid and 70% to 80% by weight of the methyl acrylate, ethyl acrylate and hydroxypropyl acrylate, respectively.

* * * * *